United States Patent
von Morzé

(10) Patent No.: US 7,665,242 B2
(45) Date of Patent: Feb. 23, 2010

(54) ENVIRONMENTALLY SAFE METHOD FOR CONTROLLING OR DETECTING INSECTS

(76) Inventor: Elisabeth von Morzé, 1319 Carvo Ct., Los Altos, CA (US) 94024

( * ) Notice: Subject to any disclaimer, the term of this patent is extended or adjusted under 35 U.S.C. 154(b) by 78 days.

(21) Appl. No.: 10/250,816

(22) PCT Filed: Jan. 11, 2002

(86) PCT No.: PCT/US02/00766

§ 371 (c)(1),
(2), (4) Date: Jul. 9, 2003

(87) PCT Pub. No.: WO02/055775

PCT Pub. Date: Jul. 18, 2002

(65) Prior Publication Data

US 2004/0067708 A1    Apr. 8, 2004

Related U.S. Application Data

(60) Provisional application No. 60/261,681, filed on Jan. 13, 2001.

(51) Int. Cl.
*A01M 1/20* (2006.01)

(52) U.S. Cl. .......................................... 43/107

(58) Field of Classification Search ................ 43/132.1, 43/124, 107, 114, 118, 121; 119/626; 428/903, 428/85, 89, 91, 96; 442/123, 124, 125, 215, 442/216, 218
See application file for complete search history.

(56) References Cited

U.S. PATENT DOCUMENTS

| | | | | |
|---|---|---|---|---|
| 322,268 | A | * | 7/1885 | Edge et al. ................... 43/136 |
| 2,138,926 | A | * | 12/1938 | Karfiol ....................... 43/114 |
| 4,961,930 | A | * | 10/1990 | Perdelwitz et al. .......... 424/411 |
| 5,233,787 | A | * | 8/1993 | Andersen ................... 43/132.1 |
| 5,681,637 | A | * | 10/1997 | Kessler et al. ................ 428/85 |
| 6,247,505 | B1 | * | 6/2001 | Worman ..................... 139/396 |
| 6,824,850 | B2 | * | 11/2004 | Nourigat .................... 428/41.8 |
| 2004/0092185 | A1 | * | 5/2004 | Grafe et al. ................. 442/153 |

FOREIGN PATENT DOCUMENTS

| | | |
|---|---|---|
| JP | S58-224636 A | 12/1983 |
| JP | H08-172998 A | 7/1996 |
| JP | 10-102609 A | 4/1998 |
| JP | S62-038832 A | 2/2000 |

* cited by examiner

*Primary Examiner*—Arti Singh-Pandey
(74) *Attorney, Agent, or Firm*—Herwig Von Morzé

(57) ABSTRACT

An environmentally safe method for controlling insects is provided, which prevents the invasion of social insects into areas where their presence is undesirable. A method for detecting the presence or appearance of social insects is also provided. Environmentally safe means adapted for controlling or detecting insects are disclosed.

13 Claims, No Drawings

ENVIRONMENTALLY SAFE METHOD FOR CONTROLLING OR DETECTING INSECTS

CROSS-REFERENCES TO RELATED APPLICATIONS

This application is the national phase of PCT International Application No. PCT/US02/00766, filed Jan. 11, 2002; which claims the priority of U.S. Provisional Application No. 60/261,681, filed Jan. 13, 2001.

STATEMENT REGARDING FEDERALLY SPONSORED RESEARCH AND DEVELOPMENT (Not applicable).

INCORPORATION-BY-REFERENCE OF MATERIAL SUBMITTED ON A COMPACT DISC (Not applicable).

BACKGROUND OF THE INVENTION (1) Field of the Invention

My invention provides an environmentally safe method for controlling insects. More specifically, my method prevents or deters the invasion of social insects—that is, those insects that move systematically and en masse into areas where their presence is undesirable, such as buildings, dwellings, houses and other constructions. The invention also provides a method for disorienting social insects and preventing them from pursuing their target pathways or reaching their intended locations. My invention also provides a method for detecting the presence or appearance of social insects. The invention also provides means adapted for controlling or detecting insects, more specifically, social insects. Such means comprise building or construction elements or materials adapted to control or deter the infestation by social insects.

(2) Description of the Related Art Including Information Disclosed Under 37 CFR 1.97 and 37 CFR 1.98

Social insects such as ants or other insects live in colonies with large populations. They leave their colonies or nests regularly to pursue various instinct-driven functions or tasks depending on the social status and the mission of the individual. It is well known that worker ants, for example, have functions different from those of warrior ants.

In pursuit of these functions, worker ants will leave their colony and migrate over considerable distances (many multiples of their body size) on their target pathways to reach their intended locations. If their nest is in the vicinity of buildings or dwellings, they will frequently enter these buildings through small openings or cracks and, once having entered, will use certain preferred pathways. Buildings are often constructed with a narrow opening or groove between the wall material of a building and the floor material along the walls, a groove which social insects can use as a convenient pathway to reach their target location. For example, during a dry period, ants may seek out a water faucet. Alternatively, worker ants may search for food or other insects or insect larvae that they live on—for example, termites—or will search out other insects with which they have a symbiotic relationship.

The infestation by social insects of buildings or dwellings is very difficult to control. Insecticides are frequently used, such as boric acid, arsenic oxide, or phosphorous-organic compounds, which are often sprayed onto the ground, usually outside buildings. However, I have found that the application of insecticides often provides only temporary relief. The social insects tend frequently to reappear, often after only a few weeks of application. In addition, because social insect infestations are very common, the firms that offer spray services are much in demand; as a result, customers may have to order such services days or even weeks before the firms are able to come to the infested location. Over the years that I have attempted to control infestation by social insects, particularly ants, I have noticed that infestations do not occur in any easily predictable pattern, which makes the use of spraying services a less than workable solution. In order to achieve continuous control, the spraying services will offer regular applications (for example, every three months), but such an application will use a significant amount of insecticide material, and not necessarily when there is a peak in the infestation. In addition, these services are expensive. Most importantly, I am very reluctant to use spraying services especially inside the house, because of the exposure of human beings (particularly children) or domestic animals to the highly toxic insecticides. Even the more toxic products are not, for all that, immediately effective. This is the case even for those products, which the consumer may purchase, and use on his own. In the case of commercially available ant traps, for example, poisoned insects are still able to leave the baits and continue to migrate until they die. In fact, for such insecticidal applications to work, the ants that have ingested the poison must go back to their nest and poison other ants including the queen. It is self-evident that the migration of poisoned insects in a family dwelling is not desirable, particularly in the food areas, such as a kitchen or pantry. I have frequently used baits with insecticidal material, such as sugar with boric acid, which is commercially available. However, such commercially available baits are only effective for a relatively short time period, are frequently in need of replacement, and are quite expensive. While boric acid is the least toxic to humans and pets, it is the least effective against ants. In addition, in family dwellings, toxic baits are a considerable hazard to children and pets. For that reason, water companies and the agencies administering federal, state or local anti-pollution programs are very concerned about the use of these baits, as I note below.

The insecticidal sprays and powders are often poisons that do not work selectively on the social insects to be controlled, but are also toxic to other social insects, which should not be affected by the insecticide. In addition, the use of insecticides in the vicinity of fruit trees or vegetables is not desirable. Furthermore, most of the sprays or powders available cause allergic reactions in humans or animals; therefore, it is undesirable to use them indoors. Finally, social insects, such as ants, certainly carry out useful functions in their natural environment. For example, ants are generally beneficial in the garden. They attack termites and eat the larvae and eggs of many pests, including fleas and aphids. Therefore, the ultimate object of a social insect control program would not be to kill the insects but to prevent infestation by insects of buildings, dwellings and other structures. I believe that the currently offered solutions do not achieve the desired objectives.

I studied a lot of literature on the subject of ant control, including a brochure issued by the Santa Clara Pollution Prevention Program in January 1997, entitled *Urban Runoff Pollution*. This brochure suggested caulking openings where the ants enter the house. This solution is not really practicable, because one does not always know where the openings are, and even the tiniest openings will permit ants to enter buildings. In addition, not all areas are suitable for caulking. However, when I caulked openings near my kitchen windowsill, I noted that ants trying to crawl over the freshly caulked area got stuck in the caulking. This observation prompted me to investigate a non-chemical, mechanical solution to the problem. I then applied diatomaceous earth to the cracks, as suggested by the brochure, but noticed little or no effect. This powder cannot, moreover, be applied in all situations.

After having been the victim of ant infestation of my kitchen for many years during which I had not been able to find a satisfactory solution to this problem, I discovered a very simple, environmentally safe solution in the form of a mechanical method, which does not require the use of any insecticide, and is highly effective and affordable. Also, the materials used can be re-used without any limitation.

BRIEF SUMMARY OF THE INVENTION

My new method involves the application of a fibrous material with a high surface area or of high liquid absorption capability to areas, which attract social insects. Such areas include grooves, openings, cracks, or other areas that attract social insects into buildings, dwellings or other structures built by humans. I speculated that contact with the fibrous material would be, for a time period, sufficient to deter said social insects from invading or infesting these structures, or to disorient or disable the social insects in such a way that they cannot proceed on their targeted pathways. Surprisingly, I found that contact for a few hours to several days is generally sufficient to prevent entry of the social insects into the building or to prevent their continued migration on their preferred pathways. However, the exact duration of the contact with the fibrous material is not critical and could be for shorter or longer time periods. The time period necessary can be easily determined on the basis of the type of infestation. After the fibrous material has been applied to the infested area for a few hours, one can readily check its impact by visual inspection; for example, one can count the number of insects in a given area prior to and after the contact with the fibrous material. The typical effect of contacts with fibrous materials of affected areas is described in the Examples. Generally a heavier infestation of a building will require longer periods of application of the fibrous material.

The nature of the fibrous material is not critical as long as it has a relatively high surface area or is highly absorbent. The term "a relatively high surface area" is intended to refer to a material which is capable of restricting the movement of social insects of a length of about 1/50 to 3" (about 0.05-7.6 cm), more preferably about 1/20 to 1" (about 0.1-2.5 cm). The term "a relatively high surface area" will be explained in more detail below, when I describe the surface structure of the fabric. The alternative term "highly absorbent" refers to the capacity of the fibrous materials to absorb multiples of its weight of liquids, such as water. The term is merely used to characterize fabrics of the micro fiber type, which will be described in more detail below. For many indoor applications, the liquid-absorbing capacity does not interfere with the use of the fibrous material in conjunction with my invention, because the areas whose invasion by social insects is to be controlled will be dry. For outdoor uses, high water absorbency in the fibrous material may adversely affect performance. In those cases, the use of water repellant fibrous materials or fibrous materials with a water repellant would be preferred. Since most commercially offered micro fiber material absorbs water, its preferred use as social insect control is indoors. The fibrous material preferred in my method of insect control or detection will have a fabric basis, and not fibrous material in loose form. Also, man-made fibrous material is preferred.

BRIEF DESCRIPTION OF THE SEVERAL VIEWS OF THE DRAWINGS(S)

(Not applicable)

DETAILED DESCRIPTION OF THE INVENTION

Fibrous materials made from textile fibers are preferred. Particularly preferred are fibrous materials of the soft furnishings or household textile types. These materials are fabrics used in households, hotels, motels, restaurants, offices, stores, recreational facilities or hospitals. Examples of such woven fabrics or fibrous materials include pile weave fabrics, which have a ground fabric with an extra set of yarns woven or tied into the ground fabric, and projecting from it as cut ends or loops on one or both sides of the ground fabric. An example of a suitable fibrous material is terry cloth, which is a type of cloth covered on both sides with uncut loops of fabric. One set of filling yarn is interwoven with two sets of warp yarn, one of which is held tight and the other is left loose, forming the loops. Terry cloth is highly absorbent and is fabric used for bath towels, beach coats, absorbent dishtowels, absorbent or high surface areas cleaning cloths, such as washcloths. Remnants of such materials are also useful. Another kind of fibrous material, such as terry cloth of which the loops have been cut (either on one side or on both sides), is also useful. Particularly preferred, however, are soft fabric materials or cloth made of micro fibers. Such fabrics are used as chemical-free cleaning towels. For example, the Christmas Catalog 2000 of *Solutions* offers a micro fiber cloth called MIRACLE CLOTH® that has a special weave, a dense loop-and-rib weave with thousands of soft and superfine fibers. This cloth has a very high liquid absorption capacity and can be easily washed and re-used. It is typically made of polyester and or polyamide fibers. A preferred cloth suitable for my method of social insect control is made of 80% polyester and 20% polyamide. Another highly suitable fabric is a high performance micro fiber towel produced by Micro fiber Unlimited, Inc. of San Diego, Calif. Suitable micro fiber products will have at least about 64 micro fiber loops per square inch (about 10 per $cm^2$), more preferably about 144-1300 micro fiber loops (about 20-200 per $cm^2$), most preferably about 256-600 micro fiber loops per square inch (about 40-95 per $cm^2$). These micro fibers usually extend about 1/16 to 1/4" (about 0.1-0.2 to 0.6-0.7 cm) above the surface of the ground fabric on both sides. However, suitable micro fibers may extend more or less than that range above the ground fabric. As an alternative, soft and thick bath or hand towels or similar absorbent materials or remnants of such materials may also be used for my method, although those materials are less preferred. Such towels will have anywhere from about 144 to 600 micro fiber loops per square inch (about 20-95 per $cm^2$), which extend about 1/16 to 1/4" (about 0.1-0.2 to 0.6-0.7 cm) above the surface of the ground fabric on both sides. Micro Fiber is 100 times thinner than a human hair. Using an industrial microscope, one can see the difference in fabrics. The thread in materials like cotton and wool look to be thick with rounded edges, just like string, while micro fiber displays thousands of "edges" on each thread. Smart Microfiber Systems in Edmonton, Alberta, Canada indicates in its web site materials that the micro fibers are split into wedge shaped areas that are woven into loops that create tiny pockets which create the high absorbency and surface area.

Because the size of ants may vary significantly from species to species from about 1/50" to 1" (about 0.05-2.5 cm) in length, it is likely that the geometric structure of the fibrous material would have to be varied in order to achieve the best control of the social insect. It is obvious that the density, length and size of the loops or fibers and the dimensions of the fibrous materials would have to be adjusted to an extent which could be simply determined by trial and error. That is, by counting the insects prior and after application of the fibrous material in the infested area, the effect of the variation of the geometric structure of the fibrous material on insect control could be determined.

The size of the area of contact of the fibrous materials with the social insects attracting areas is not critical, but depends on the degree of infestation and the size of the social insect. In general, for small insects of a size of 1/50-1/4" (about 0.05-2.5 cm), the fibrous material should have a width of at least about 2" (about 5 cm) and a length of at least about 5" (about 12-13 cm), where the width of the insect path is about 1" (about 2.5 cm). The length of the insect path in a dwelling may vary considerably, from about 5-10" (about 12-25 cm) to about 40' (about 12 m) or even more. For example, MIRACLE CLOTH® will have a size of about 14"×16" (about 35 cm×40 cm). If this cloth is used, I have found it best to roll it up and place the rolled-up cloth lengthwise in contact with the area infested by social insects such as ants. The ants will explore the surface area of the cloth near the infested area (for example, the groove between a wall and the floor of a room in a dwelling often will be a pathway chosen by ants). A number of ants will leave their intended pathway and migrate into the cloth. They then get caught in these three-dimensional structures and are unable to continue their march to the target location. The larger the number of fibers extending from the ground fabric per $cm^2$, the higher is the surface area Often, it will be sufficient to use a single cloth to prevent the infestation. However, with heavier infestations, it is often advantageous to put several pieces of cloth in contact with the affected area It is sometimes difficult to determine the entry area for the social insects into a dwelling. However, if a sufficient area that has been infested is in contact with the fibrous material, the social insects will, surprisingly, discontinue their migration to their target location. It appears that the high surface area of the fibrous material has a disorienting or disabling effect on social insects, in addition to its effectiveness in trapping them or restricting their ability to move. Because of the social insect's intelligence, the presence of the insurmountable obstacle is presumably signaled to other individuals of the colony, who then decide to choose a different path of migration, which either does not involve infestation of the dwelling or requires placing fibrous material into the new migration path to control the infestation.

My invention, thus, includes a method for controlling the migration of social insects, which comprises removably placing a fibrous material with a high surface area or high absorption capacity in contact with a location where invasion by such social insects is suspected or observed. For some applications, the fibrous material may have to be removably attached to the infested area or where insect infestation is expected, for example, part of a wall. After the attached fibrous material has achieved the desired social insect control, it can be detached from the area The term "removably attached" includes the use of adhesives that achieve a temporary attachment to the area to be treated. Such adhesive materials are usually of the pressure-sensitive type and allow removal of the fibrous material without leaving any markings. For example, disposable mounting tape or disposable VELCRO® brand fasteners, or masking tape, as it is used for paint jobs, may be applied to temporarily attach the fibrous material to the surface that is infested or prone to infestation.

My method does not require any particular shape of the insect-controlling fibrous material. It may be in the shape of a square, rectangle, roll, rod, snake or wedge (in order to be in closer contact with an infested area), etc. Generally a deformable shape is preferred, as it is adjustable to the geometry of the area to be controlled. However, the fibrous material may also be permanently attached to different building materials used in construction. For example, the fibrous material may be glued to baseboards, which will be attached to walls.

The preferred embodiment of my new method does not involve the use of an insecticide, although it is possible to add an insecticide to the fibrous material. In that case, however, some of the advantages of my method will be lost. The method will no longer be completely safe and have environmental disadvantages similar to when an insecticide is used. However, the combined effect of using the fibrous material and the insecticide together will permit a reduction of the amount of insecticide being used to control the social insect infestation. In addition, less harmful materials such as insecticidal soap may be used in conjunction with my method.

A key advantage of my method is that, after the infestation has been controlled, the fibrous material can simply be removed until the threat of a new infestation occurs. The fibrous material may again be brought in contact with the infested area as the need arises. The material is completely re-usable for social insect control, and may be washed and used for other purposes. In general, no insecticides are involved and the material's efficacy does not fade over time as with an insecticide. The fibrous material is safe for children and pets, although small children and pets may have to be trained to stay away from the area whose infestation is to be controlled.

My new method for detecting the entry of social insects into areas where their invasion is undesirable comprises placing fibrous materials with a high surface area or high liquid absorption capacity in locations where invasion of such social insects is suspected and determining, for example, by counting the number of insects in the fibrous material to determine the various points of entry. My method permits a rather direct determination of the various points of entry, because the entered individuals will be disabled as soon as they migrate into the fibrous material.

The fibrous materials of my invention may be directly used in the construction of buildings in areas infested by social insects. Fibrous material with a high surface area, which has the ability to control the movement of social insects attached to a material used in the construction of a building, may be used. In many cases, it will be beneficial to permanently attach the fibrous material to the building material. However, my invention also includes the use of fibrous material in the construction of a building where the fibrous material is used in loose form, not directly attached to other building materials such as wood or metals. My invention, thus, includes a building or construction which limits the movement of social insects, wherein said building or construction comprises building or construction elements which include the use of fibrous material with a high surface area to control the movement of social insects in areas in the building prone to invasion by such insects.

My invention includes fibrous material with a high surface area or of high liquid absorption capability adapted for controlling or detecting insects, more specifically, social insects. This fibrous material includes instructions for placing said fibrous material in contact with a location where such social insects are suspected or observed. For example, said instructions would be located on the fibrous material itself on its packaging, or could be attached to the fibrous material.

EXAMPLE 1

In a hardwood floor kitchen, which was periodically infested by brown ants of about ⅛ " (about 0.3 cm) length, migrating along the groove formed between the kitchen wall baseboards facing the back yard and the hardwood flooring, the affected area was about 40' (about 12 m) long and included part of the kitchen counter leading to the kitchen sink, a preferred target location of the ants. The infested area included a fireplace, several windows and a French door leading to the backyard. In the affected area, I counted, on average, approximately 7-10 ants/square inch (about 1-2 ants per $cm^2$) during an infestation.

At various times, I used a number of methods of insect control. In order to control the infestation, I had the outside backyard area along the entire house sprayed with diazinone, without any spraying inside the kitchen. After the spray service, then number of ants inside the house was slightly and temporarily reduced to approximately 1-5 ants/square inch (about 0-2 per $cm^2$), but complete control was not achieved. In a second attempt, I placed boric acid baits next to the suspected entry areas, but the ants continued to enter the kitchen area While I noted a temporary reduction in the number of ants, the infestation continued at a substantially unabated rate. Finally, I used baits with hydramethylon, the active ingredient in COMBAT®. While more ants were killed more rapidly, I was unable to achieve complete control of the infestation for any length of time, as the killed ants were replaced with new ants coming through the various openings to the outside.

After all these methods of ant control had failed, I cleared the pathways of the ants completely using a vacuum cleaner. I had counted on average about 7-10 brown ants per square inch prior (about 1-2 per $cm^2$) to applying the vacuum cleaner. Thereafter, I placed 22 pieces of rolled-up MIRACLE CLOTH® in contact with the ant-infested area. I covered the entirety of the infested area on the ground, because I did not know the ants' points of entry into the house. The infested area consisted of the grooves formed between the baseboards of the kitchen walls and the kitchen hardwood floor, which were used by the ants as a pathway to the kitchen sink. After about half an hour after contact, the infestation had essentially disappeared, although individual ants were still noticeable, particularly those that avoided the general pathway. After several hours, no ants were noticeable on the previously used pathway when several pieces of the cloth were lifted from it. Upon closer inspection of the micro fibers, I counted from 0 to 7 ants per piece of cloth These ants, which were partly still alive but immobilized, were distributed as follows: 6 in two pieces of cloth next to the fire place (a suspected of entry into the house), 0-3 in 9 pieces of cloth along the large kitchen window, 6 in the kitchen corner next to the second (small) window (a suspected location of entry into the house), and 0-7 along the kitchen door leading to the backyard and the second small window. The 7 ants were found in the piece of cloth adjacent to the second small window (another suspected location of entry). After removal of the fibrous materials after 24 hours, no further infestation occurred for several weeks.

EXAMPLE 2

In the area described in Example 1, an ant infestation was under control a couple of hours after a piece of rolled-up MIRACLE CLOTH® was placed at each of the suspected entry locations.

EXAMPLE 3

In a small bathroom, of which the infested area consisted of the space between the bathroom door on the one hand, and the area around the toilet, the shower and the sink on the other, the placement of two pieces of rolled-up MIRACLE CLOTH® at the threshold of the bathroom door area achieved complete ant control within a few hours.

EXAMPLE 4

In order to block the pathway of fire ants, which were attracted by a kitchen sink, I placed two pieces of rolled-up MIRACLE CLOTH® at the narrower edge of an L-shaped tiled kitchen counter across the counter surface and attached the end piece of the cloth to the top of the kitchen cabinet under the counter. In addition, I attached two additional pieces of rolled-up MIRACLE CLOTH® with masking tape to the wall tiles adjacent to the narrower counter surface to form a continuous area covered with MIRACLE CLOTH®. In addition, at the wider edge of the L-shaped counter, similarly, I placed three pieces of the cloth, which I secured, at both sides, to the wooden top boards of the kitchen cabinet under the counter. This arrangement achieved control of the ant infestation on the kitchen counter.

The invention claimed is:

1. An environmentally safe, non-chemical method for detecting, preventing, or controlling the migration of social insects in to an area in buildings, dwellings, houses or other constructions infested by social insects or prone to insect infestation by restricting insect movement, which method comprises the following steps:
   (a) placing an insecticide-free micro fiber material with a high surface area having at least about 10 micro fiber loops per $cm^2$ in contact with a location in the building, dwelling, house or other construction where invasion by the social insects is suspected or their presence is observed; and
   (b) maintaining the contact with said micro fiber material for a time period sufficient to mechanically restrict or deter movement of the social insects.

2. The method of claim 1 for detecting the migration of social insects, the method further comprising the step of determining the number of mechanically restricted insects disabled in the micro fiber material.

3. The method of claim 1 where the micro fiber material is removably or permanently attached to a material used in the construction of a building.

4. The method of claim 3 where the micro fiber material is attached to the material used in the construction of the building before or during placement of that material into the building.

5. The method of claim 1 where the micro fiber material is water repellant.

6. The method of claim 1 where the placing of the micro fiber material is done indoors.

7. The method of claim 1 where the placing of the micro fiber material is removable, the method further comprising the step of removing the micro fiber material from said location after movement of the social insects has been restricted.

8. The method of claim 1 wherein the micro fiber material is a pile weave fabric having a ground fabric with a set of yarns woven or tied in to the ground fabric and projecting from one or both sides of the ground fabric as cut ends or loops.

9. The method of claim 8 wherein the micro fiber material has from about 20 to 95 micro fiber loops per $cm^2$, the micro fiber loops projecting from both sides of the ground fabric about 0.1 to 0.6 cm above the ground fabric.

10. A chemical-free, environmentally safe building or construction material for preventing or controlling the migration of social insects in to an area infested by social insects or prone to insect infestation comprising an insecticide-free, micro fiber material with a high surface area having at least about 10 micro fiber loops per $cm^2$ and being capable of mechanically restricting or deterring the movement of the social insects into the area infested by social insects or prone to insect infestation, permanently attached to material used in the construction of a building.

11. The building or construction material of claim 10 is water repellant.

12. The building or construction material of claim 10 wherein the micro fiber material is a pile weave fabric having a ground fabric with a set of yarns woven or tied in to the ground fabric and projecting from one or both sides of the ground fabric as cut ends or loops.

13. The building or construction material of claim 10 having from about 20 to 95 micro fiber loops per $cm^2$, the micro fiber loops projecting from both sides of the ground fabric about 0.1 to 0.6 cm above the ground fabric.

* * * * *